United States Patent
Shigeshiro

[11] Patent Number: 5,562,020
[45] Date of Patent: Oct. 8, 1996

[54] STIRRING BLADE DRIVING DEVICE FOR BREAD MAKER

[75] Inventor: Isao Shigeshiro, Daito, Japan

[73] Assignee: Funai Electric Co., Ltd., Japan

[21] Appl. No.: 575,755

[22] Filed: Dec. 20, 1995

[30] Foreign Application Priority Data

Dec. 21, 1994 [JP] Japan .................. 6-016805 U

[51] Int. Cl.⁶ .............. A21B 1/00; A21D 8/00; A47J 27/00; H05B 1/02
[52] U.S. Cl. ................. 99/327; 99/335; 99/348; 219/492; 219/497; 219/507; 366/98; 366/146; 366/314; 366/601
[58] Field of Search .................... 99/325–331, 348, 99/468; 219/492, 497, 501, 507, 464, 521; 310/62, 63; 364/143, 146, 400, 557; 366/98, 146, 314, 601; 426/523, 466

[56] References Cited

U.S. PATENT DOCUMENTS

| | | | |
|---|---|---|---|
| 4,903,587 | 2/1990 | Nagasaka et al. | 99/325 |
| 4,903,589 | 2/1990 | Aoyama | 99/348 |
| 4,930,899 | 6/1990 | Aoyama | 366/98 |
| 4,984,512 | 1/1991 | Takahashi et al. | 99/327 |
| 5,076,153 | 12/1991 | Takahashi et al. | 99/327 |
| 5,351,606 | 10/1994 | Matsuzaki | 310/62 X |
| 5,364,183 | 11/1994 | Shibata | 366/314 X |
| 5,415,081 | 5/1995 | Yoshida et al. | 366/146 X |
| 5,426,580 | 6/1995 | Yoshida et al. | 364/143 |
| 5,433,139 | 7/1995 | Kitagawa et al. | 364/400 X |
| 5,435,235 | 7/1995 | Yoshida | 366/601 X |
| 5,466,913 | 11/1995 | Tanimoto et al. | 219/492 |
| 5,477,776 | 12/1995 | Shmokubo et al. | 99/348 |

*Primary Examiner*—Timothy F. Simone
*Attorney, Agent, or Firm*—Bacon & Thomas

[57] ABSTRACT

A stirring blade driving device for a bread maker. In the device, a stirring blade is rotated by a motor having a main coil and speed-changing coils, and the respective coils of the motor are selectively connected to an ac power supply by a plurality of triacs. The on/off operation of the triacs is controlled by a microcomputer in accordance with the number of revolutions of the stirring blade.

7 Claims, 3 Drawing Sheets

STIRRING BLADE DRIVING DEVICE FOR BREAD MAKER

BACKGROUND OF THE INVENTION

The invention relates to a stirring blade driving device for driving a stirring blade that mixes such bread making ingredients as flour, water, and baking yeast in a bread maker that is constructed so as to effect mixing, primary fermentation, secondary fermentation, and baking of the bread making ingredients once the ingredients are poured into a case.

A bread maker of this type includes within a main body thereof a case, a stirrer, and a heater. The main body has a domelike cover constructed of a transparent glass piece. The case serves to contain bread making ingredients. The stirrer serves to mix and knead the bread making ingredients contained in the case. The heater is used to ferment and bake the bread making ingredients.

In a conventional bread maker the stirring blade is controlled by a microcomputer that controls the operation of the bread maker as a whole. That is, the stirring blade is controlled so as to rotate continuously or intermittently for a predetermined time at a predetermined speed in accordance with sequences corresponding to a plurality of prearranged menus.

In the thus constructed bread maker, the rotational speed of the stirring blade that rotates within the bread maker to mix dough is a very important factor for determining the quality of a product that is obtained.

Since a stirring blade driving device arranged in the conventional bread maker drives the stirring blade at a predetermined speed, such factors as mixing conditions of the bread making ingredients used, total quantity, and ambient conditions cannot be taken into consideration for determining the driving condition. As a result, production of high quality bread has not always been ensured.

SUMMARY OF THE INVENTION

The object of the invention is, therefore, to provide a stirring blade driving device for a bread maker capable of always producing high quality bread by adjusting the rotational speed of the stirring blade finely in accordance with such factors as quantity and quality of the bread making ingredients and ambient conditions.

To achieve the above object, the invention provides a stirring blade driving device provided to drive a stirring blade for mixing bread making ingredients in a bread maker for mixing, fermenting, and baking the bread making ingredients poured into a case, the stirring blade driving device comprising: a motor having a main coil and a speed-changing coil for rotating the stirring blade; a plurality of triacs for selectively connecting an ac power supply to the respective coils of the motor; and a controller for controlling an on/off operation of the triacs in accordance with the number of revolutions of the stirring blade.

Further, the invention provides a stirring blade driving device provided to drive a stirring blade for mixing bread making ingredients in a bread maker for mixing, fermenting, and baking the bread making ingredients poured into a case, the stirring blade driving device comprising: a motor having a main coil and a speed-changing coil for rotating the stirring blade; a plurality of triacs for selectively connecting an ac power supply to the respective coils of the motor; and a controller for controlling an on/off operation of the triacs in accordance with the lapse of time from the beginning of mixing of the bread making ingredients.

DETAILED DESCRIPTION OF THE PREFERRED EMBODIMENT

An embodiment of the invention will now be described in detail with reference to the accompanying drawings.

Figure 1:
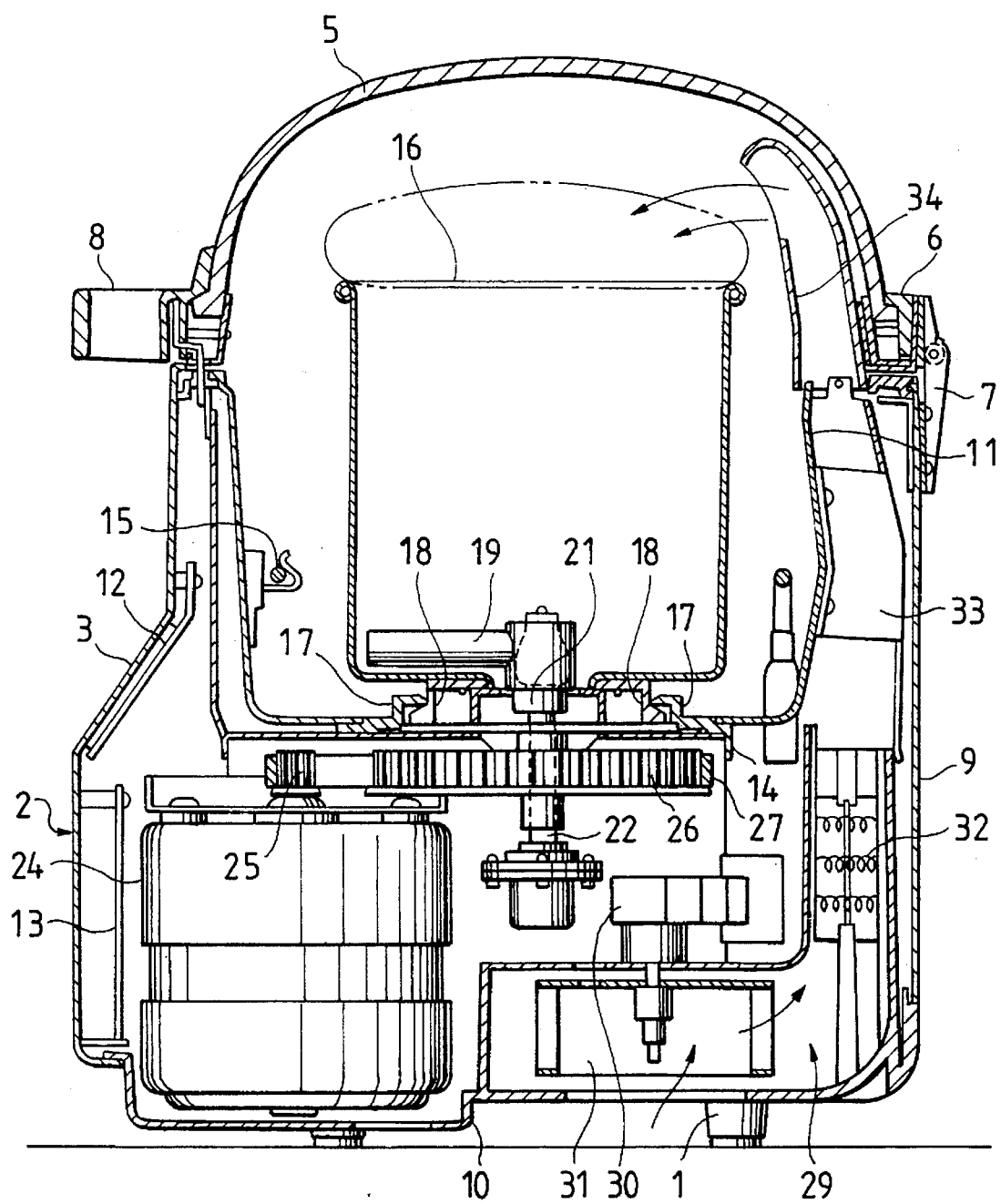
FIG. 1 is a longitudinal sectional view of a bread maker having a stirring blade driving device, which is an embodiment of the invention.

FIG. 1 is a longitudinal sectional view showing the entire part of a bread maker. The bread maker has a cylindrical main body 2 supported by support legs 1. In the middle of the front of the main body 2 is an operation panel 3 that allows a user to set a timer and select a finishing condition. Further, not only handles (not shown) that allow the user to carry the bread maker are provided on the main body 2, but also a domelike cover 5 constructed of a transparent glass piece is provided on the top of the main body 2 so that the cover can be freely opened and closed.

More specifically, the rear part of the cover 5 is fastened to a pivoting bracket 7 of the main body 2 through a frame 6, and a grip 8 is integrally formed on a portion of the frame 6, the portion being on the front side of the cover 5.

Further, the main body 2 includes a cylindrical outer case 9, a bottom case 10, and a bottomed cylindrical inner case 11. The bottom case 10 is fixed to an end portion of the outer case 9. The inner case 11 is arranged in the upper half of the outer case 9 to form an oven chamber. On the inner side of the front surface of the outer case 9 are a board 12 and an operation circuit board 13, the board 12 having a display and switches.

Further, a base 14 erected on the bottom case 10 supports the bottom portion of the inner case 11 with the upper surface thereof. An annular heat ray radiation type main heater 15 is arranged over the inner circumferential surface of the inner case 11.

Still further, a baking case 16 that is of cylindrical structure for containing bread making ingredients is provided within the inner case 11 so as to be releasable through retaining tonguelike pieces 17 and 18. A stirring blade 19 is arranged inside the baking case 16.

The stirring blade 19 is releasably mounted on the upper end of a rotary shaft 22 that is supported by a bearing plate 21. The stirring blade 19 is driven to rotate by motive power transmitted from a main motor 24 through a timing pulley 25, a timing belt 27, and a timing pulley 26.

Further, an air introducing path 29 is arranged within the outer case 9. An air blowing fan 31 that is driven by a shaded pole fan motor 30 is arranged within the air introducing path 29. A heater 32 is arranged on the blowing side of the air blowing fan 31, so that air flowing through the air introducing path 29 can be heated to a predetermined temperature. The heated air is directed to a dough in the baking case 16 by the action of a blowing duct 33 and a guide duct 34.

Figure 2:
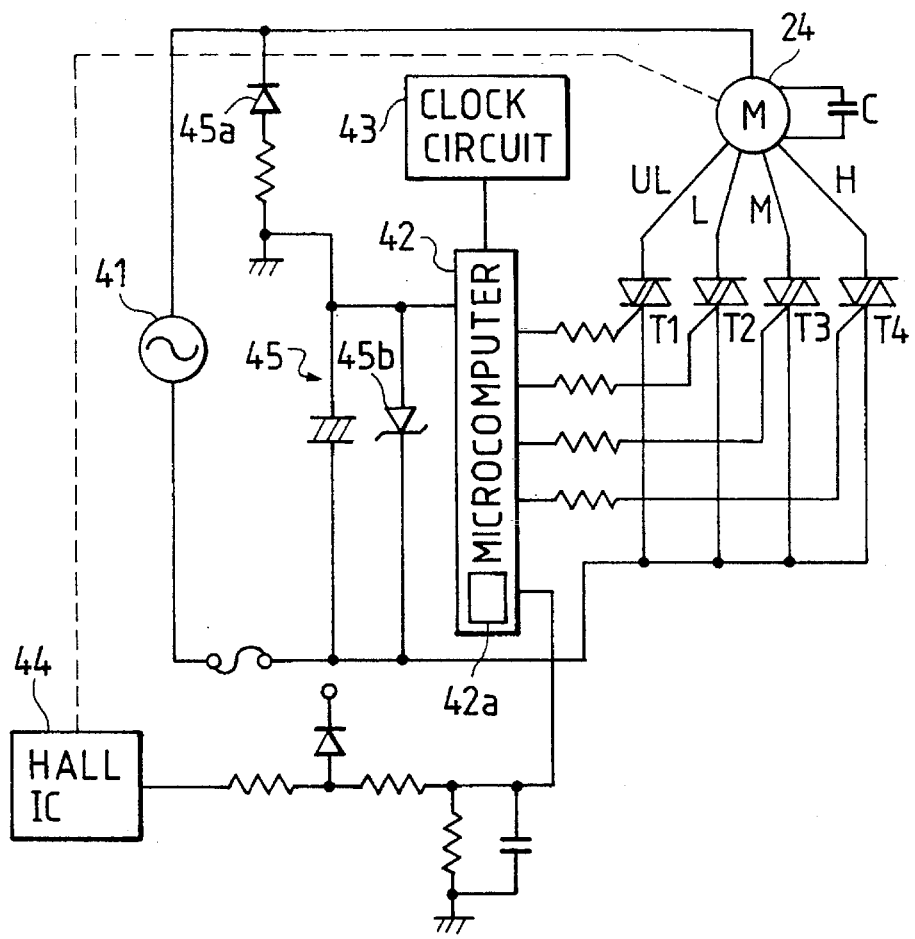
FIG. 2 is a circuit diagram of the stirring blade driving device shown in FIG. 1.
Figure 3:
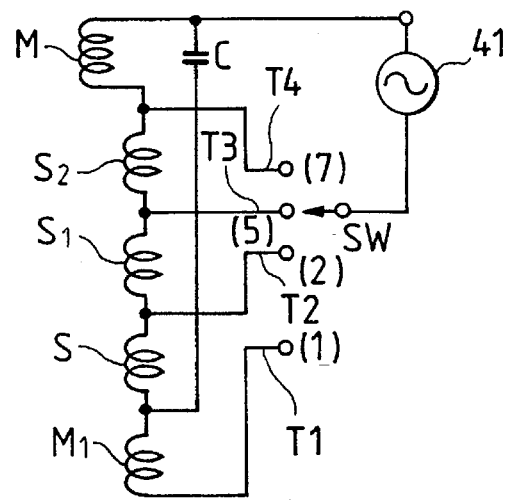
FIG. 3 is a diagram showing an equivalent circuit of the windings of a motor in the stirring blade driving device shown in FIG. 1.

FIG. 2 shows a circuit of a driving device for driving the stirring blade 19 of the bread maker shown in FIG. 1, and FIG. 3 shows connection of the windings of the motor 24.

In FIGS. 2 and 3, reference numeral 41 designates an ac power supply; 42, a microcomputer that is a controller; 43, a clock circuit for the microcomputer 42; 45, a power supply circuit for the microcomputer 42, the circuit serving to rectify the ac power supply 41 with a diode 45a and stabilize the rectified power with a Zener diode 45b; and 44, a Hall IC including a Hall element for detecting the load or number of revolutions of the motor 24 (stirring blade 19).

The motor 24 is, as shown by the equivalent circuit in FIG. 3, designed so that a main coil M and speed-changing coils S, S1, S2, M1, which are connected in series to one another, are connected to the ac power supply 41 through triode ac switches (triacs) T1 to T4.

More specifically, the gates of the respective triacs T1 to T4 are connected so as to be controlled by the microcomputer 42. When the triac T1 turns on, current flows through the main coil M, the speed-changing coils S to S2 and M1, so that the motor 24 is rotated at a first speed (UL), which is a low speed. When the triac T2 turns on, current flows through the main coil M and the speed-changing coils S1 and S2, so that the motor 24 is rotated at a second speed (L).

Similarly, when the triac T3 turns on, current flows through the main coil M and the speed-changing coil S2, so that the motor 24 is rotated at a fifth speed (M), which is a medium speed, and when the triac T4 turns on, current flows only through the main coil M, so that the motor 24 is rotated at a seventh speed (H), which is a high speed. The triacs T1 to T4 are depicted as a switch SW in FIG. 3.

In the thus constructed stirring blade driving device for the bread maker, the microcomputer 42 supplies gate signals to the gates of the triacs T1 to T4 based on signals from the Hall IC 44. Here, it should be noted that these triacs are controlled so as to turn on at a zero crossing timing to control noise made at the time the motor turns on.

The microcomputer 42 switches the level of each of the four output ports to "H" or "L" in accordance with a preset program based on the magnitude of the load applied to the stirring blade 19 or the number of revolutions of the stirring blade 19 detected by the Hall IC 44. As a result of this operation, the microcomputer 42 switches the rotational speed of the motor 24 to one of four different levels, the seventh speed (H), the fifth speed (M), the second speed (L), and the first speed (UL), by turning on one of the triacs T1 to T4. Further, the microcomputer 42 switches the on/off operation of the triacs T1 to T4 with a predetermined short period of time so that such medium speeds as the sixth speed, the fourth speed, and the third speed can be selected.

Reference numeral 42a in FIG. 2 designates a selecting means that is the firmware for selectively connecting the plurality of triacs T1 to T4 to the respective coils of the motor 24. The selecting means 42a alternately switches, e.g., the triacs T3 and T4 from one to the other with a predetermined period of time so that the sixth speed, which is in between the fifth speed and the seventh speed, can be obtained.

Figure 4:
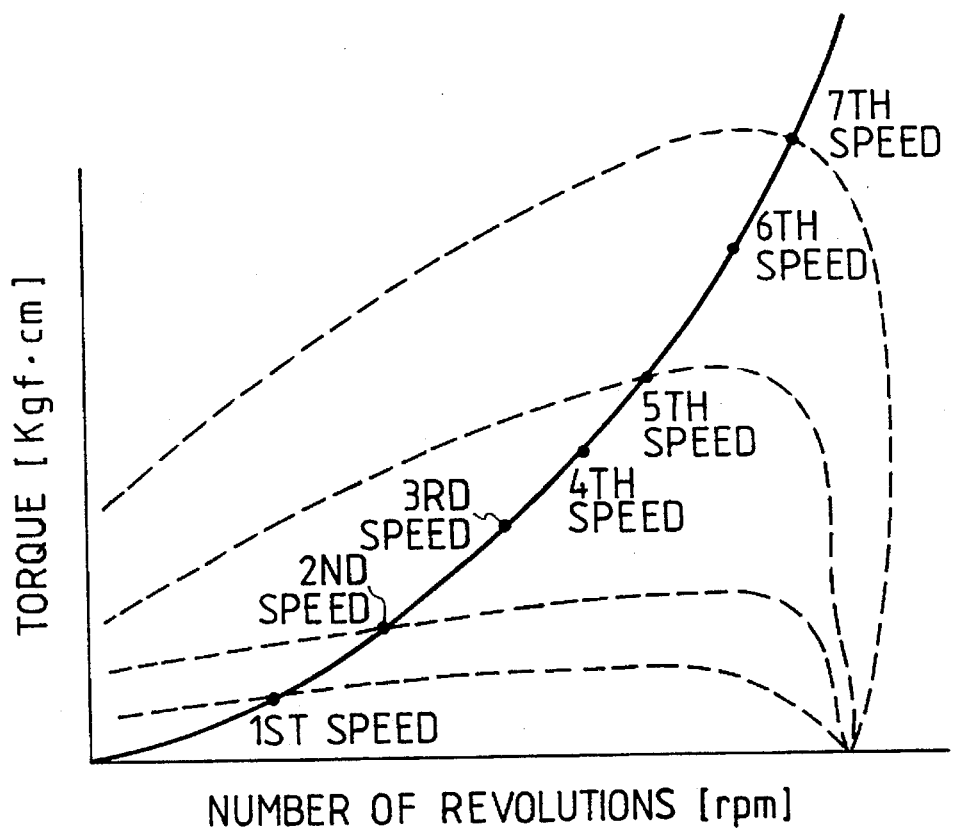
FIG. 4 is a graph showing a relationship between the number of revolutions and torque of the motor.

A relationship between the number of revolutions (rpm) and torque (kg.f.cm) of the motor 24 is shown in FIG. 4. In FIG. 4, the solid line indicates the case where a fixed load is applied to the motor 24, and the broken line indicates the case where no load is applied to the motor 24.

As described in the foregoing, the stirring blade driving device is characterized as including a motor that has a main coil and speed-changing coils for rotating a stirring blade, a plurality of triacs for selectively connecting an ac power supply to the respective coils of the motor, and a controller for controlling the on/off operation of the triacs in accordance with the number of revolutions of the stirring blade. Therefore, the optimal mixing conditions can be obtained so as to match the conditions that are changed by such factors as the mixing condition of bread making ingredients used, total quantity, and ambient conditions. Hence, the stirring blade driving device can provide the advantage of always producing high quality bread.

Figure 5:
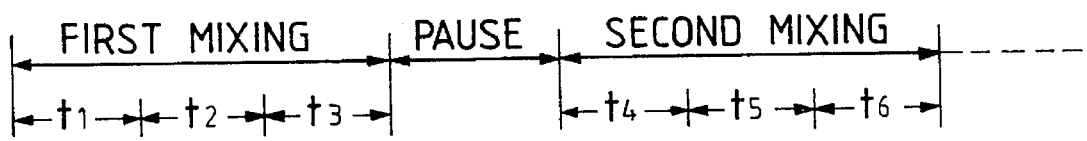
FIG. 5 is a chart for explaining an example of the operation of the stirring blade driving device shown in FIG. 1.

Further, the rotational speed of the motor 24 may be switched in accordance with the lapse of time from the beginning of mixing of the bread making ingredients. Specifically, as shown in FIG. 5, the first mixing period is divided into three small periods $t_1$ to $t_3$ and the second mixing period is divided into three small periods $t_4$ to $t_6$. In each of the small periods, the rotational speed of the motor 24 is controlled so as to be different from each other. For example, the first speed is selected in period $t_1$, one of the third to seventh speeds is selected in period $t_2$, and one of the fifth to sixth speeds is selected in period $t_3$. Further, one of the third to fourth speeds is selected in period $t_4$, one of the fifth to sixth speeds is selected in period $t_5$, and one of the second to fourth speeds is selected in period $t_6$. Here, for example, $t_1$=one minute, $t_2$=seven minutes, $t_3$=six minutes, $t_4$=four minutes, $t_5$=five minutes, and $t_6$=five minutes. Such a control of the rotational speed of the motor 24 can be realized by controlling the on/off operation of the triacs T1 to T4 with the microcomputer 42.

Also in the above case where the rotational speed of the motor is switched in accordance with the lapse of time from the beginning of mixing, the optimal mixing conditions can be obtained to produce high quality bread.

What is claimed is:

1. A stirring blade driving device provided to drive a stirring blade for mixing bread making ingredients in a bread maker for mixing, fermenting, and baking the bread making ingredients poured into a case, said stirring blade driving device comprising:

a motor having a main coil and a speed-changing coil for rotating the stirring blade;

a plurality of triacs for selectively connecting an ac power supply to the respective coils of said motor; and a controller for controlling an on/off operation of said triacs in accordance with the number of revolutions of the stirring blade.

2. The stirring blade driving device according to claim 1, wherein said controller turns on one of said triacs.

3. The stirring blade driving device according to claim 1, wherein said controller alternately turns on two of said triacs with a predetermined period of time.

4. The stirring blade driving device according to claim 1, further comprising a Hall element for detecting the number of revolutions of the stirring blade.

5. A stirring blade driving device provided to drive a stirring blade for mixing bread making ingredients in a bread maker for mixing, fermenting, and baking the bread making ingredients poured into a case, said stirring blade driving device comprising:

a motor having a main coil and a speed-changing coil for rotating the stirring blade;

a plurality of triacs for selectively connecting an ac power supply to the respective coils of said motor; and a controller for controlling an on/off operation of said triacs in accordance with the lapse of time from the beginning of mixing of the bread making ingredients.

6. The stirring blade driving device according to claim 5, wherein said controller turns on one of said triacs.

7. The stirring blade driving device according to claim 5, wherein said controller alternately turns on two of said triacs with a predetermined period of time.

* * * * *